United States Patent
Gross et al.

(10) Patent No.: US 8,755,604 B1
(45) Date of Patent: Jun. 17, 2014

(54) USING SHAPE SIMILARITY METHODS TO IMPROVE OCR SPEED AND ACCURACY

(75) Inventors: Ari David Gross, West Hempstead, NY (US); Raphael Meyers, Long Beach, NY (US); Navdeep Tinna, Mississauga, CA (US); Yunhao Shi, Flushing, NY (US)

(73) Assignee: CVISION Technologies, Inc., Forest Hills, NY (US)

( * ) Notice: Subject to any disclaimer, the term of this patent is extended or adjusted under 35 U.S.C. 154(b) by 1237 days.

(21) Appl. No.: 12/479,561

(22) Filed: Jun. 5, 2009

Related U.S. Application Data

(60) Provisional application No. 61/059,213, filed on Jun. 5, 2008, provisional application No. 61/090,924, filed on Aug. 22, 2008.

(51) Int. Cl.
*G06K 9/00* (2006.01)

(52) U.S. Cl.
USPC ............... 382/181; 382/185; 382/187

(58) Field of Classification Search
USPC ............. 382/181, 182, 185, 186, 187
See application file for complete search history.

(56) References Cited

U.S. PATENT DOCUMENTS

| | | | | |
|---|---|---|---|---|
| 5,577,177 A * | 11/1996 | Collins et al. | ............... | 345/469 |
| 5,594,809 A * | 1/1997 | Kopec et al. | ............... | 382/161 |
| 5,956,419 A * | 9/1999 | Kopec et al. | ............... | 382/159 |
| 6,678,410 B1 * | 1/2004 | Phinney et al. | ............... | 382/181 |
| 6,748,115 B1 * | 6/2004 | Gross | ............... | 382/237 |
| 7,454,067 B1 * | 11/2008 | Pati | ............... | 382/225 |
| 8,103,132 B2 * | 1/2012 | Tzadok et al. | ............... | 382/311 |
| 2006/0045341 A1 * | 3/2006 | Yi | ............... | 382/182 |
| 2007/0110314 A1 * | 5/2007 | Houle et al. | ............... | 382/186 |
| 2008/0063278 A1 * | 3/2008 | Vincent et al. | ............... | 382/182 |
| 2008/0174459 A1 * | 7/2008 | Ohk et al. | ............... | 341/51 |

OTHER PUBLICATIONS

Shang et al., JBIG@ Text Image Compression Based on OCR, SPIE vol. 6067, 2005, pp. 1-12.*
Susan Haigh, "Optical Character Recognition (OCR) as a Digitization Technology," Network Notes # 37, Information Technology Services, National Library of Canada (Nov. 15, 1996), pp. 1-6.
Junqing Shang et al., "JBIG2 Text Image Compression Based on OCR," The Internal Society for Optical Engineering, Tsinghua University (Jan. 16, 2006), vol. 6067 pp. 12.
Junqing Shang et al., "OCR Result Optimization Based on Pattern Matching," Proceedings, Document Recognition and Retrieval XIV, 65009 (Jan. 29, 2007), vol. 6500 pp. 1-8.
Qin Zhang et al., "Better PostScript than PostScript—portable self-extracting PostScript representation of scanned document images," Department of Computer Science, Dartmouth College (1997).

(Continued)

*Primary Examiner* — John Strege
(74) *Attorney, Agent, or Firm* — Kenyon & Kenyon LLP

(57) ABSTRACT

A system and method may include a processor that groups the glyphs of a document into font character models. OCR processing may be performed to identify the ASCII value of the font character models, with the results mapped to the glyphs contained with those models, thereby identifying the text of the original document. This results in fewer calls to an OCR engine, thereby providing a significant speedup. Further, when a model is assigned differing text values by the OCR engine, the system and method may identify the value most likely to be correct, thereby improving the accuracy of the output text.

41 Claims, 6 Drawing Sheets

(56) References Cited

OTHER PUBLICATIONS

Gary Huang et al., "Cryptogram Decoding for Optical Character Recognition," Department of Computer Science, University of Massachusetts (2006), pp. 1-12.

Scott Leishman, "Shape-free Statistical Information in Optical Character Recognition," Department of Computer Science, University of Toronto (2007), pp. 1-140.

\* cited by examiner

USING SHAPE SIMILARITY METHODS TO IMPROVE OCR SPEED AND ACCURACY

CROSS-REFERENCE TO RELATED APPLICATIONS

This application claims priority to U.S. Provisional Patent Application No. 61/059,213, filed Jun. 5, 2008, and to U.S. Provisional Patent Application No. 61/090,924, filed Aug. 22, 2008, the disclosures of both of which are herein incorporated by reference in their entireties.

BACKGROUND

Optical Character Recognition (OCR) is the electronic translation of images of text into machine-editable code. For every letter or character on the page, an OCR program attempts to deduce its ASCII value. The most common method of doing this is "feature extraction" which, according to Susan Haigh, *Optical Character Recognition (OCR) as a Digitization Technology*, Network Notes #37, Information Technology Services, National Library of Canada (Nov. 15, 1996), "identifies a character by analyzing its shape and comparing its features against a set of rules that distinguishes each character/font." Thus, OCR may include mapping various features or feature combinations to an ASCII value. Other OCR methods include matching a glyph to a stored bitmap associated with an ASCII value.

JBIG2 is a compression format for binary documents, which is designed to take advantage of the similarity between distinct glyphs in the same document. It generally uses digital geometry pattern matching techniques such as the Weighted XOR or rank Haussdorf distance between glyphs to determine if they are in the same font character class. As the format is oblivious to the textual information on the page, it makes no attempt to identify the ASCII value of the glyphs or to fit them into any pre-computed font character categories.

In short, OCR and JBIG2 provide two very different solutions to two very different problems. Junqing Shang et al., *JBIG2 Text Image Compression Based On OCR*, The Internal Society for Optical Engineering, Tsinghua University (Jan. 16, 2006) ("Shang") discusses an attempt to directly use the techniques developed for OCR to help with JBIG2. Many implementations of JBIG2 have a high error rate. Shang refers to using an OCR engine to determine when to match glyphs together to improve the compression ratio while decreasing the error rate. Specifically, Shang states the following. "The JBIG2 (joint bi-level image group) standard for bi-level image coding is drafted to allow encoder designs by individuals. In JBIG2, text images are compressed by pattern matching techniques. In this paper, we propose a lossy text image compression method based on OCR (optical character recognition) which compresses bi-level images into the JBIG2 format. By processing text images with OCR, we can obtain recognition results of characters and the confidence of these results. A representative symbol image could be generated for similar character image blocks by OCR results, sizes of blocks and mismatches between blocks. This symbol image could replace all the similar image blocks and thus a high compression ratio could be achieved. Experiment results show that our algorithm achieves improvements of 75.86% over lossless SPM and 14.05% over lossy PM and S in Latin Character images, and 37.9% over lossless SPM and 4.97% over lossy PM and S in Chinese character images. Our algorithm leads to much fewer substitution errors than previous lossy PM and S and thus preserves acceptable decoded image quality."

Junqing Shang et al., *OCR Result Optimization Based on Pattern Matching*, Proceedings Vol. 6500, Document Recognition and Retrieval XIV, 65009 (Jan. 29, 2007) ("Shang 2") discusses using the standard JBIG2 pattern matching to improve OCR results. Frequently the same "feature extraction" rules which can confidently identify some glyphs on a page may not be able to confidently identify other glyphs on the page. Shang 2 therefore proposes a post-OCR processing step of using standard JBIG2 type pattern matching techniques (such as weighted XOR). If any glyphs whose confidence level regarding its value, using OCR, is below a certain threshold matches a glyph whose confidence level regarding its value, using OCR, is above the threshold, the less confident glyph is given the ASCII value of the more confident glyph to which the less confident glyph matches via JBIG2. Thus, the system allows for glyphs with low confidence levels to assume the ASCII value of a more confident glyph, if it matches it. As a consequence, OCR results could be improved on certain data sets. Specifically, the abstract of Shang 2 states the following. "Post-processing of OCR is a bottleneck of the document image processing system. Proof reading is necessary since the current recognition rate is not enough for publishing. The OCR system provides every recognition result with a confident or unconfident label. People only need to check unconfident characters while the error rate of confident characters is low enough for publishing. However, the current algorithm marks too many unconfident characters, so optimization of OCR results is required. In this paper we propose an algorithm based on pattern matching to decrease the number of unconfident results. If an unconfident character matches a confident character well, its label could be changed into a confident one. Pattern matching makes use of original character images, so it could reduce the problem caused by image normalization and scanned noises. We introduce WXOR, WAN, and four-corner based pattern matching to improve the effect of matching, and introduce confidence analysis to reduce the errors of similar characters. Experimental results show that our algorithm achieves improvements of 54.18% in the first image set that contains 102,417 Chinese characters, and 49.85% in the second image set that contains 53,778 Chinese characters."

One aspect that has hampered the introduction of JBIG2 matching techniques into the OCR process is the high error rate of most JBIG2 implementations. In addition, the slow processing speed of current OCR engines made them unsuitable as a required step of JBIG2 compression technique.

DETAILED DESCRIPTION

Figure 1:
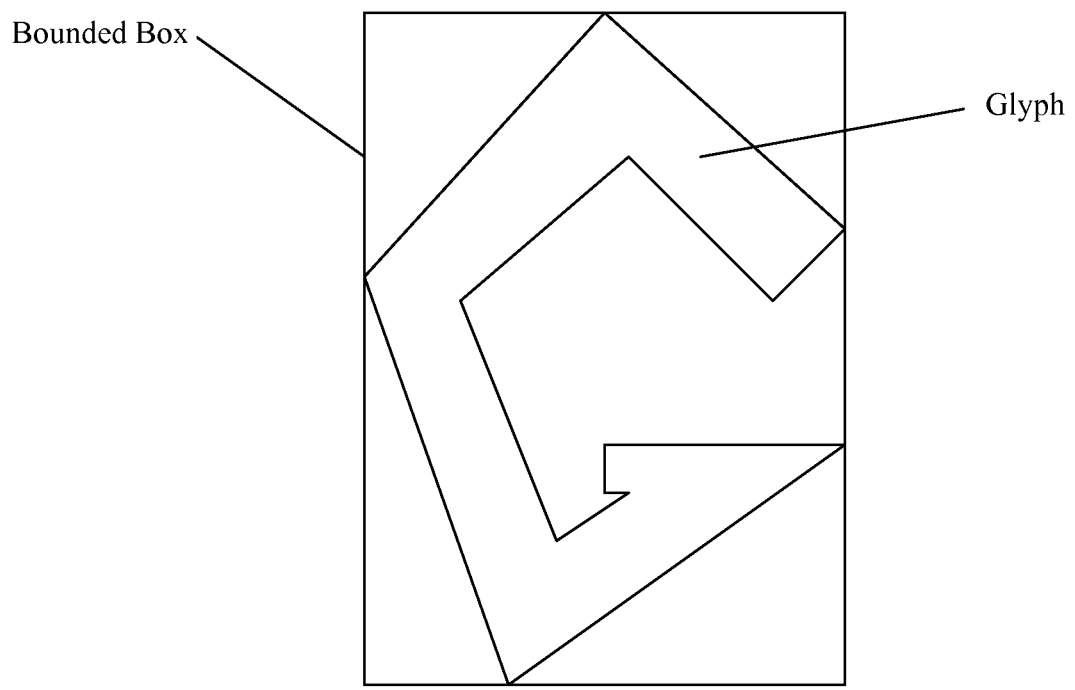
FIG. 1 illustrates a glyph in a bounding box, for use according to an example embodiment of the present invention.

Example embodiments of the present invention use JBIG2-type matching techniques to both enhance and speed up OCR processing. For example, contrary to example embodiments of the present invention, while Shang2 may provide for applying JBIG2 matching techniques for enhancing OCR processing, the matching of Shang2 is only from high confidence OCR values to low confidence OCR values, such that the conventional OCR processing is required without any speed-up. Moreover, example embodiments of the present invention provide for use of JBIG2-type matching techniques for error correction to change a value for a glyph from that which a conventional OCR engine has assigned. In contrast to such embodiments, Shang2 merely provides for use of JBIG2 matching techniques to assign a value to a glyph where the OCR engine has not assigned the value, i.e., where the OCR engine has determined that any value determined to be possibly assigned to the glyph has too low a confidence score to be assigned.

U.S. Provisional Application Ser. No. 60/966,094, filed Aug. 24, 2007, U.S. Provisional Patent Application Ser. No. 60/967,815, filed Sep. 7, 2007, U.S. patent application Ser. No. 12/198,055, filed Aug. 25, 2008, and U.S. patent application Ser. No. 12/206,707, filed Sep. 8, 2008, the entireties of the disclosures of which are incorporated herein by reference, discuss some techniques which may be used to quickly and confidently match glyphs together, e.g., using JBIG2 technology. The existence of a robust and efficient digital geometry pattern matcher optimized for scanned bitmaps, e.g., as discussed in those provisional patent applications, may enable improvements to OCR processing that have not been previously considered.

In example embodiments of the present invention, OCR processing time may be sped up by classifying all presumed textual glyphs on a page into model classes. For example, a perceptually lossless matcher, e.g., as provided according to the various embodiments discussed in the above-referenced patent applications, may be used for the classifications. A perceptually lossless matcher may be a Quadrant Hausdorff matcher, which requires that every black pixel finds a corresponding black pixel within distance one in the same quadrant direction. Another example of a perceptually lossless matcher is a Tangent matcher, which requires that every black pixel with a white four neighbor (above, below, right, or left) find a corresponding black pixel that shares a same white four neighbor. Another strict perceptually lossless matcher is a feature matcher, which requires that the neighborhood surrounding each pixel in one bitmap finds a compatible neighborhood surrounding a corresponding pixel in the second bitmap.

In an example embodiment of the present invention, a symbolic value of the bitmaps of a glyph may be considered. The relative position of the glyphs may accordingly be taken into account. For example, in an example document, an apostrophe and a comma may have similar or even identical bitmaps. Even though the bitmaps are perceptually identical, the system of the present invention may group the glyphs into different models. To do so, the system may consider a position of the glyphs within the respective bounding boxes of their respective words or lines. The apostrophe will be towards the top, and the comma will be towards the bottom. The system may accordingly determine that they do no match irrespective of results of a conventional perceptually lossless matcher. For example, under these conditions, the system may refrain from presentation of those glyphs for matching by the matcher. Alternatively, the system may crop the bitmaps so that they each have the same topmost and bottommost position within their respective word or line. The two bitmaps will then have the same heights, which will be the heights of the words or lines in which they appear. However, with respect to the apostrophe, the black pixels will appear near the top of the bitmap, while, with respect to the comma, the black pixels will appear closer to the bottom. Therefore, if the modified bitmaps are presented to a conventional perceptually lossless matcher, the matcher will not match the glyphs.

A model class, also referred to herein as a "model" or a "glyph model" is that to which all glyphs determined to be of the same font character prior to digitization are mapped or otherwise belong. For example, a model may be a set of glyphs determined to be sufficiently similar. Often various glyphs which actually represent the same letter belong to the same model. Ideally, every glyph that represents the same font character will belong to the same model. Further, a model may include one or more composite bitmaps representative of constituent glyphs, e.g., formed via a grayscale blending of the glyphs. Instead of applying OCR processing to each glyph of a page in the document that is input for processing, a new "model reference page" is generated, which includes a minimum cover of all of the models generated based on the glyphs of the page, and OCR is applied to the new model reference page. The minimum cover may include at least one representation of each generated model. For a particular model, the minimum cover may include the one or more of the constituent glyphs, composite bitmaps, and/or sub-composite bitmaps of other models that have been joined into the model. Thus, the system and method of the present invention may provide for applying OCR processing only one time for each model. Once the OCR processing returns the ASCII values for the models of the model reference page, the system and method of the present invention may map the ASCII values back to the glyphs of the original document. Thus, once OCR processing is applied to a model, there may be no need to apply OCR processing to additional instances of the model in order to determine its ASCII value.

The minimum cover need not be restricted to a set of models on the model reference page that represent all the glyphs in a portion of the document. In a preferred example embodiment, the model reference page is a minimum set of words from the document that represents all the font character models found in this section of the document. This is alternatively referred to as a min word cover. Showing the OCR engine whole words, instead of font character models, usually yields greater OCR accuracy and allows for verification of the word in a dictionary. In a preferred example embodiment, a min k word cover might be used, where the model reference page includes a set of words from the original document such that each font character model encountered is included in at least k words on the model reference page.

In an example embodiment of the present invention, a system and method may initially segment a document page or the document as a whole into regions likely to represent text while excluding non-textual data, such as a picture or graphics, and generate the models for the determined textual regions. The system and method may then apply OCR processing to the model representations.

In an example embodiment of the present invention, separate modules may be used for model generation and OCR processing. For example, a first module may initially determine a set of font character models from the document (e.g., a model reference page), which the first module may forward to an OCR processing module for obtaining ASCII values.

Inter-page font character learning is where information about the font characters on one page of a document is used to assist the processing of future pages of the document. A conventional OCR engine does not benefit from inter-page font character learning, and so each page is effectively processed as if it was a separate document. As a result, using a typical commercial OCR system, it frequently takes N times longer to interpret an N page document than a one page document, even when every page in the document is identical. According to an example embodiment of the present invention, perceptually lossless font character learning, e.g., JBIG2-type matching, may be used to learn both intra-page and inter-page font character models. Intra-page font character learning is where information about the font characters on a page of a document is determined based on the information of that same page. Once a model has a confirmed ASCII value, it may be inefficient for the system to solve for it again. Rather, such a value may be propagated across the document. In yet another alternative example embodiment of the present invention, the system and method may maintain models and their associated ASCII values even for use across multiple documents.

The glyphs on a page may be matched into models, and the models generated for a given page may be matched to models previously generated for other pages within the same document. This is a standard technique in JBIG2 bitonal compression, where the models are referred to as "global font models," and frequently results in glyphs on different pages being mapped to the same model. Instead of separately applying OCR processing to each page in the document, the new model reference page may include models representing glyphs found throughout the document, so that application of the OCR processing to the model reference page allows for mapping back of the determined ASCII values to glyphs spanning multiple pages of the input document, thereby further increasing the speed by which OCR processing may be applied to a document.

Figure 3:
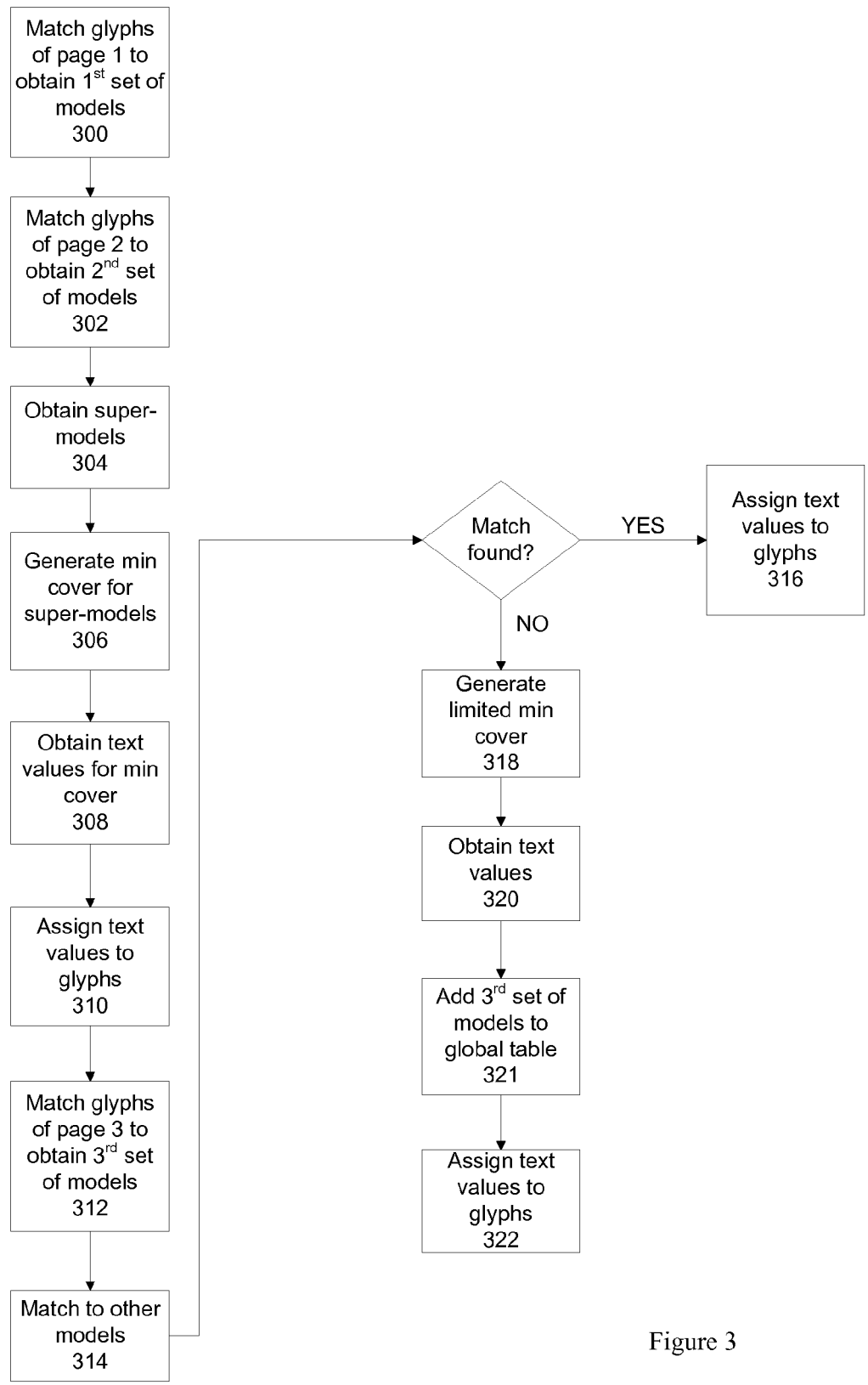
FIG. 3 is a flowchart that illustrates a method for assigning text values to glyphs, according to an example embodiment of the present invention.

FIG. 3 illustrates an example method for ascertaining text values, e.g., ASCII values for glyphs of multiple pages of a document. At step 300, the system of the present invention matches glyphs of a first page to obtain a first set of models. These models may be placed in a global table available for reference in processing subsequent pages. At step 302, the system matches glyphs of a second page to obtain a second set of models, which may be placed in the global table. At step 304, the system matches models of the first page and models of the second page to obtain super-models. At step 306, the system generates a minimum cover for the super-models. At step 308, the system obtains text values for the minimum cover using OCR processing. At step 310, for each super-model, the system assigns the respective obtained text value to each of the glyphs belonging to the super-model.

In an example embodiment of the present invention, the above-described fast OCR techniques may be used for both backward and forward propagation. For example, in an instance where multiple pages, e.g., 20 pages, have been processed with their glyphs classified into models, the models may be placed into a model reference page to which OCR processing is applied. The resulting ASCII values associated with each model may be "backward propagated" to all glyphs on the 20 previous pages. Once the ASCII values of these models are known, the system and method of the present invention may also "forward propagate" the ascertained values for processing of subsequent pages in the document. In forward propagation mode, once a global font model (font character model) has been recognized, i.e., mapped to an ASCII value or set of values, future glyphs that match the global font model will receive or "inherit" the model's text value. In an example embodiment, the glyphs of subsequently processed pages may first be matched to obtain a local model, the local model may then be matched to a previously recognized model, and the ASCII value may then be assigned to all of the glyphs belonging to the local model. For example, referring again to FIG. 3, at step 312, the system matches glyphs of a third page of the document to obtain a third set of models. At step 314, the system matches the third set of models to models of the first and/or second models or to the super-models. At step 316, the system assigns the text values of the first, second, and/or super-models to the matched ones of the third set of models. While not illustrated, in an example embodiment, the $3^{rd}$ set of models may be added to the global model table as separate models. Additionally, further super-models may be formed to which belong the matched ones of the $3^{rd}$ set of models and the prior models to which they have been matched.

In an example embodiment of the present invention, a case of pure backward propagation may be used. For example, model reference pages to which are applied OCR processing may be generated only after processing all the glyphs in the document to generate a complete set of models. For many documents a single model reference page will contain all the models in the document, and once their text values are obtained, the values may be applied to the entire document. For other documents, e.g., not well-behaved, multiple model reference pages may be necessary, and these may be processed once they are generated. For some documents, there may even be a model reference page generated for each page in the document, which may limit the expected OCR speed increase of this technique.

In an example embodiment of the present invention, a case of pure forward propagation may be used. For example, according to this embodiment, the system and method may proceed to a next page only after a textual value has been ascertained for every symbolic glyph of the current page. For the current page, the system and method may initially attempt to apply the ASCII values of models of previously processed model reference pages that were generated for prior pages of the document. If a value for one or more of the glyphs cannot be determined in this manner, the system and method may create a model reference page for the current page and apply OCR processing to the current page. In an example embodiment, the model reference page generated for the current page may include models for only those glyphs of the current page whose values were not ascertainable from the previously OCR-recognized model values.

For example, referring again to FIG. 3, if a model match is not found for one or more models of the third page, the system, at step 318, generates a limited minimum cover for the unmatched models. For the limited minimum cover, at step 320, the system uses an OCR processing to obtain text values for the cover. At step 321, the $3^{rd}$ set of models may be added to the global model table. At step 322, the system assigns text values obtained for the limited cover to the glyphs corresponding to the represented models of the limited cover. It is noted that the precise order in the sequence of the steps of FIG. 3 may be modified. For example, step 322 may be performed prior to step 321.

In other example embodiments, a mix of backward and forward propagation may be used for a given processed page. For example, instead of steps 318-322, if a model of a current page does not match a model of the global table which has been assigned a text value, the system may include the model in the global table without assigning to the model a text value. As further pages are processed, models of those pages may be added to the global table and matched to the unassigned models of the current page, and the value may be assigned to the model of the current page based on those subsequent matches, according to various methods described herein, e.g., using a dictionary, other matchers, or by indirect matching of the current model via the models of the further pages to other models that had been assigned a text value. Alternatively, the models of the current page may be added to the global table initially without determining its text values and an OCR engine may be applied to those models of the current page at a later time.

When a model fails to find a match with a global font model by using a perceptually lossless matcher, it still may be possible to ascertain its textual value in other ways, e.g., without requiring use of a new minimum cover for unmatched models. These include attempting to use the textual value of the model's closest neighbor, where "closest" can be ascertained using a perceptual distance metric as described in the above-referenced patent applications and/or as described below. The system and method may determine whether a word resulting from application of the value determined for the model's closest neighbor to the unmapped model is found in a pre-stored word dictionary. The system and method may also determine whether application of any other value to the unmapped model also results in a word that is found in the dictionary. If a resulting word is found only with application of the ASCII value of the model's closest neighbor and not with application of any other value, then the system and method may, at least tentatively, apply the value of the closest neighbor to the unmapped model. The ASCII value of the model's closest neighbor may be used even though the model has not been mapped to its closest neighbor via a matcher. In an example embodiment of the present invention, the assigned textual value may be only tentative and may require further corroborating evidence from subsequently processed pages that result in calculation of a high confidence score for the application of the value of the model's closest neighbor to the unmapped model. Corroborating evidence may include using the value for subsequent instances of the model or a close approximate thereto and determining that resulting words are found in the model dictionary. Thus, the application of an ASCII value to a model may be obtained without matching the model to any other models.

In an example embodiment of the invention, the text of each page can be encoded using model indices, without ascertaining the model's ASCII mapping. In this variation, each model index becomes an element in a font library that is being dynamically defined, e.g., on a page by page basis. For each page, the "text" of each page is encoded in real-time, without actually determining the ASCII mapping of each font character model. This method is not in any way language specific, and defining the font library happens after completely analyzing the document and assigning all model indices. At this point, an OCR process is run on a model reference page for the entire document and the correct ASCII mappings are assigned. The document "font" can now be defined in its entirety, where each font index corresponds to both a bitmap and ASCII code(s). This paradigm fits directly into the method in which a font is defined in ADOBE PDF. Each document page is encoded as an image, with a hidden text layer defined using the document font. Once the font has been defined, which occurs after the document is fully analyzed, and each font character model has its ASCII assignment, the document becomes fully text-searchable. The advantage of this method is that the text for each page can be encoded as the page is processed, without the need for back propagation of the text stream.

An alternative embodiment of this invention is similar to the method given by Qin Zhang and John M. Danskin in *Better PostScript than PostScript—portable self-extracting PostScript representation of scanned document images* (1997). In this embodiment, each page is encoded with the dynamic document font, where each glyph is referenced using its font model index. Instead of an image layer, the page is represented by the text layer, which is visible and not transparent. In this method, only non-symbolic glyphs would be represented using a "cleanup" image layer.

An OCR speedup can be achieved by limiting calls to the OCR engine. One technique for doing so, which works very well with the present system, is cryptogram numerization. Gary Huang et al., *Cryptogram Decoding for Optical Character Recognition*, Department of Computer Science, University of Massachusetts (2006) ("Huang") discusses ways of obtaining textual values without having to call an OCR engine. Specifically, the abstract of Huang states the following. "Optical character recognition (OCR) systems for machine-printed documents typically require large numbers of font styles and character models to work well. When given a document printed in an unseen font, the performance of those systems degrade even in the absence of noise. In this paper, we perform OCR in an unsupervised fashion without using any character models by using a cryptogram decoding algorithm. We present results on real and artificial OCR data." Similar OCR speed optimizations using numerization methods are given by Scott Leishman in *Shape-free Statistical Information in Optical Character Recognition*, Department of Computer Science, University of Toronto (2007).

Cryptogram numerization can be a powerful way of determining the text value of glyphs. Using a perceptually lossless matcher to group glyphs into models makes the technique even more effective (as both model fragmentation and mismatches can hurt the effectiveness of the technique). In general, the system and method uses a min word cover to ensure that each model is seen a certain number of times by the OCR engine. However, those models whose value can be uniquely determined through cryptogram numerization need not be shown to the OCR engine, as their text value has already been obtained. This may result in fewer models that need to be included in the model reference pages, which can result in fewer such pages and a subsequent speedup resulting from fewer calls to the OCR engine.

The numerization method can be used by itself as an OCR technique by finding a small set of words from a portion of the dictionary with a unique OCR solution using cryptogram numerization. For example, a greedy algorithm may be used that starts with the word seen so far in the document with the most repetitive structure, e.g., repeated models. This word, looked up in a numerization dictionary, may in and of itself have a unique solution, e.g., the numerization string of 1,2,3,3,2,3,3,2,4,4,2 maps uniquely to the English string "Mississippi." Assuming this repetitive string does not have a unique solution, there may be a look up of the next most repetitive string in the numerization dictionary as well. This may be continued, selecting in a greedy manner the most repetitive string not yet selected, until a unique solution is found. In this way, the system may solve for most of a page's ASCII mappings without explicitly calling the OCR engine. The cryptogram numerization method can be generalized to handle a typical document scan where the mapping between connected components and characters in the alphabet is not necessarily bijective.

In an improved embodiment of this invention, assuming that certain models are already in the global font table and their ASCII mappings are already known, the system may select words from the document in order of least unknown (i.e., unmapped) models. Namely, a greedy algorithm may be used that starts by selecting words most of whose models are already known by matching to existing models in the global font table. These words, with the most known models and fewest unknown models, are likely to have very few valid solutions in the dictionary. The system may continue to consider document words on the page containing unknown models until a unique solution is obtained for the currently unknown (unmapped) set of models. This "codebreaking" approach to solving for OCR is fast and utilizes all the currently available information regarding font model ASCII mappings.

In an alternative example embodiment of the present invention, instead of generating one or more model reference pages of model representations to which to apply OCR processing, the system and method may use selective zone OCR on the original input document. The system and method may initially generate a set of models from the glyphs of the document. The system and method may select portions or zones of the input document, ensuring that each model is adequately represented in the combination of the selected portions of the document. The system and method may subject the selected portions of the document to OCR processing by using zone OCR. The system and method may map back the returned values of the OCR processing to the individual glyphs of the input document, as described above when a model reference page is utilized.

In an example embodiment of the present invention, the system and method may select the sub-document as described above but may alter the sub-document so that one or more glyphs of the sub-document are replaced by the models or sub-models to which they belong. The altered sub-document may then be processed by the OCR module.

In an example embodiment of the present invention, the model reference page or the sub-document to which OCR processing is applied may include only original document glyphs rather than models or sub-models.

When the input document is in a symbolically compressed format, such as JBIG2, where the model bitmaps have already been matched and are in one or more bitmap-dictionaries, a significant speedup to the OCR process is obtained by solving for the document OCR directly from the compressed JBIG2 format. This means that the general OCR subtasks of decompressing the compressed format, e.g., TIFF G4, into a raw image and then computing connected components can be skipped over. In addition, this method to solve for OCR directly from the JBIG2 format can take advantage of the computed JBIG2 structures. That is, the font models for the document have already been computed and there is no need to re-run the JBIG2 font matcher. In this manner, a fast OCR method can take full advantage of an image that has been pre-computed to JBIG2 format, with resulting OCR processing speed that is significantly faster than working from a raw or non-JBIG2 encoded image file.

Aside from speeding up OCR processing, example embodiments of the present invention may also improve the accuracy of OCR processing. For improved accuracy, a perceptually lossless matcher, e.g., as described in the above-referenced provisional patent application, may be used. When glyphs are grouped into perceptually lossless models, glyphs matched to the same model can all be safely assumed to have the same text value. Therefore, as long as an OCR engine returns a value for one glyph, it can be used for all the other glyphs mapped to the same model. However, even the best OCR engines can make mistakes. To improve OCR processing accuracy, the system and method may perform OCR processing upon multiple representations of a single model, which may include the composite bitmap, one or more sub-composite bitmaps, and/or one or more glyphs of the model. For example, the representations may be provided in a model reference page or may be included in various selected document subsets as described above. Alternatively, the entire original document, which may include multiple representations of the models, may be subjected to OCR processing. The OCR processing may result in different values for different glyph instances of a single model. The system and method may select the most commonly returned value for the multiple glyphs and apply the selected value to all of the glyphs of the model, including those for which OCR processing resulted in a different value. Thus, OCR processing may be corrected according to this method.

Figure 4:
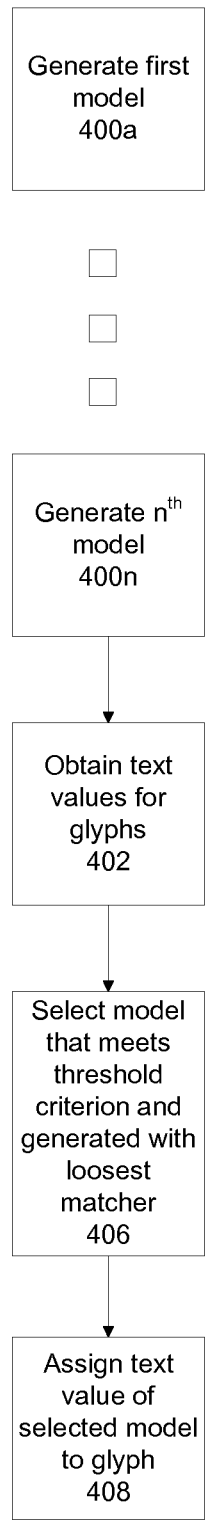
FIG. 4 is a flowchart that illustrates a method for assigning a text value to a glyph using multiple levels of matchers, according to an example embodiment of the present invention.

FIG. 4 illustrates a method of assigning a text value to a glyph using multiple levels of matchers. For example, the system may be configured to perform glyph matching with a certain number of classes of matchers, where the classes are defined by their looseness. At step 400a, the system may match a first glyph to other glyphs, e.g., of its page, using a tightest of the matching algorithms, to form a first model. The system may repeat this step for each of the other matching algorithms, until it does so at step 400n to form the $n^{th}$ model using the loosest matching algorithm, where loosest means a loosest algorithm designated in the system for use for performance of this method. In many instances, the looser the matching algorithm that is used, the greater the number of glyphs included in the model.

At step 402, the system may obtain text values for each of the glyphs of each of the 1 to n models, e.g., using a conventions OCR method. At step 404, for each of the models, the system may determine whether a threshold percentage of the glyphs of the model share the same text value. At step 406, the system may select, of those models of which at least the threshold percentage of the glyphs share the same text value, the model formed using the loosest matching algorithm relative to the other models of which the threshold percentage of the glyphs share the same respective text value. At step 408, the system may assign the text value shared by the greatest number of glyphs of the selected model to the first glyph.

In an alternative example embodiment, after each of steps 400a-400n, the system may determine whether at least the threshold number of glyphs of the respective generated model share the same text value. As soon as it is determined that a generated model does not meet this criterion, the system may proceed to step 402 without generating models using looser matchers. According to this embodiment, the system may begin by using the tightest matching algorithm and, with each further model generation step, use progressively looser matching algorithms.

In an alternative example embodiment of the present invention, instead of selecting the model obtained using the loosest matcher at step 406, the model obtained using the strictest matcher may be selected.

In an example embodiment of the present invention, after glyphs on a page are matched to models with a perceptually lossless matcher, the system may further match the models with a hierarchical set of looser matchers. Each glyph will then have membership in multiple models. There is the perceptually lossless model class to which it is first joined, a slightly looser second model to which that first model is joined, a potential third model to which that second model is joined, etc. The system may then rank the "safety" of each of those models. A model may be deemed "safe" if a sufficient number of those glyphs of the model have been assigned a textual value, and of those assigned values, there is one value which dominates. For example, the system may be configured to require that at least 20 glyphs have a textual value, and that at least 90% of those textual values agree. The system may then may find the loosest "safe" model to which a glyph belongs. The system may then assign to the glyph the dominant textual value associated with that model.

Different levels of matching algorithms may be used in other ways for glyph matching. In an example embodiment of the present invention, a strict matching algorithm may initially be used. If for a group of consecutive glyphs forming a word, all but one of the glyphs have been matched to another group of consecutive glyphs forming a word, which includes one additional glyph at a relative position that is the same as the unmatched glyph, then a looser matching algorithm may be used to determine whether the unmatched glyph of the first group matches the remaining glyph of the second group. It is noted that this may be performed whether or not the remaining glyph of the second group has itself already been matched to other glyphs. For example, a first group of glyphs may have three glyphs, of which: the left glyph has been matched to a left glyph of another group of three glyphs; the right glyph has been matched to a right glyph of the other group of glyphs; and the center glyph has not been matched. In this case, the system may use a looser matching algorithm to attempt to match the center glyph of the first group to the center glyph of the second group. A variation of this method is further described below.

Indeed, when the system fails to find a match for a glyph using a perceptually lossless matcher, it still may be possible to ascertain its text value by other methods. Similarly, in an example embodiment of the present invention, when the system fails to initially match a model to global font models using a perceptually lossless matcher, the system still may ascertain its text value by other methods. For example, by process of elimination, text values may be removed as possible text values for a model. If, by the process of elimination, only one value remains, the system may assign the remaining value to the model. If multiple values remain, the system may determine which of the remaining values is the most likely candidate for, and may assign the determined most likely value to, the model. There are several methods the system may use to eliminate possible values. The various methods can each be used independently or in conjunction.

One method is to use a looser matcher (perhaps even a perceptually lossy one) than the matcher initially used, to match the unmatched models to models of a global model table. If, using the looser matcher, multiple matches in the global table are found for a give model, the system may restrict the model's textual value to those of the found matches. For example, if all of the looser matches have the same textual value, the textual value may be applied to the model. If different ones of the looser matches have different textual values, the system may limit the model to one of those values, and use another technique to further narrow down the possible values.

As noted above, another method is to use a word dictionary. The word dictionary may contain a list of common words, it may contain words that have already appeared in the document, or it may contain a combination of the two. In an example embodiment, for a word containing a glyph of the unknown model, the system may create a text string, where all glyphs of models with known values are represented with those values, and those glyphs of models which do not yet have a value are given a wildcard value which may represent any possible value. The system then finds a list of words in the dictionary that match the text string. A model with an unknown value may be presumed to have one of the values to which the glyph of the model corresponds in the word dictionary. As glyphs of an unknown model may appear within multiple words on the page, many possible text values may be eliminated, leaving only one value which can explain all instances of the word. If there still remains multiple possible textual values, the system may include the model in the global model table, so that it may find matches on future pages. For instances of those matched models on future pages, the system may find additional words to help reduce the model to one possible text value.

As a further refinement, each word in the dictionary of common words may have a frequency counter associated with it, which lists how often the word appears within a corpus of training documents. For each string in which a glyph of a model to which a text value has not been assigned, multiple words may be found within the dictionary, the different words having different text values assigned to the string corresponding to the glyph. Each of those words corresponding to the string may occur a respective number of times within the corpus of training documents. For each text value, the system may sum the instances across the various strings. The system may assign the text value having the greatest sum to the model.

For example, a glyph of a model may appear in a word string with the letters "th" before it and the letter "n" after it. The training documents may have a number of words beginning with "th" and ending with "n" with some single character therebetween. Different ones of those words may have an "i" ("thin"), "a" ("than"), and "e" ("then"). In an example, the word "thin" may occur 10 times, the word "than" may occur 50 times, and the word "then" may occur 150 times. Another glyph of the same model may appear in a word string with different letters, e.g., the letters "he" before it and the letter "i" after it. The training document may include the words "heel" 2 times and "heal" 30 times. Thus, the text value of "i" would have a count of 10, the text value of "a" would have a count of 80 (50+30), and the text value of "e" would have a count of 152 (150+2). Thus, the text value for the letter "e" may be assigned to the model.

Another method is to use a Partial Predictive Model (PPM) to predict the text value of a model by using its neighboring text values. For example, by knowing the four letters which precede a character, the system can make a good prediction of what its value may be by using markov modeling. As opposed to conventional PPM which limits itself to characters which precede the unknown character, in an example embodiment of the present invention, the system may use a clairvoyant context which looks ahead and uses characters from both sides of the glyph. For example, the system may use the two characters to the immediate right of the glyph of the unknown model as well as the two characters to its immediate left. A space between words may be input into the context model as a space character. The system then processes a corpus of documents and keeps a counter of every value which a given context encounters. For example, the counter may be the same as the one discussed above with respect to words, except that entire words are not required. Instead, the count may be tallied for any sequence of characters.

As for the length of the context, the system may limit the context to a predetermined maximum length. For example, a maximum length of four characters may be implemented. The system may determine that the sequence of characters of the predetermined length does not occur a sifficient number of times to obtain a useful tally of the number of times a particular value is assigned to the relevant character position. In this instance, the system may select a sub-context. For example, if the initially considered context is of length 4 which includes two letters on each side of the character, the context also includes a sub-context of length 3 which includes two characters to the left and only one character to the right. This in turn includes a context of length 2 which includes one character on each side, which in turn contains a context of length 1, which includes just the character to the immediate left. Prior to selection of any particular context length, the system may initially update the statistics for each of the range of usable context lengths. Subsequent to recording the statistics for each context, the system may select the longest usable context as explained above.

The system then uses this information to determine the value of an unknown model. By looking at the context which surrounds an unknown character, the system can determine which values are associated with a sufficiently large count. Any text value which does not have a sufficient count may be eliminated from the list of possible values. Alternatively, if one text value truly dominates, the system may assign that value to the model.

In an example embodiment of the present invention, the system and method may provide that replacement of a value returned for a glyph by OCR processing with another value assigned to the model to which the glyph belongs may be performed under only certain conditions. For example, the system and method may provide that the glyph's textual value may only be replaced by that of its model when the word formed by using the glyph's value is not included in the dictionary. Alternatively or in addition, the system and method may provide for replacement only in those instances where substituting the model's value results in a word that is found in the dictionary.

In an example embodiment of the present invention, where the OCR processing returns a plurality of values for different representations of a single model, the system and method may assign to every glyph of the model the same ASCII value if the glyphs share a context. If there are differences in the context, the system and method may assign them different values.

For example, the relevant context for determining whether matched glyphs are to be assigned different ASCII values may be the relative positions of the different glyphs within each word or line. For example, a digitized apostrophe and comma may be determined to have different contexts, and as a result given different ASCII mappings. Similarly, a period and the dot of an "i" may be determined to have different contexts, and as a result given different ASCII mappings.

In yet another example, the relevant context for determining whether matched glyphs are to be assigned different values may be the ASCII values of the neighboring glyphs within the word or line in which the considered glyph appears. For example, a glyph whose neighboring glyphs are numbers may be assigned the value for the number "1," while a glyph whose neighboring glyphs are letters may be assigned the value for the letter "l."

In this regard, the general font matchers used for JBIG2 font learning may be enhanced to include context-based constraints. After the font models are computed, another matching iteration can be used to determine loose-models. An example matcher which may be used to compute these loose-model classes is a point-set Haussdorf measure, with distance 1 and rank 98. This matcher will not have much model fragmentation, where a single font character becomes fragmented if its glyphs match to more than one JBIG2 font model. Using the loose-model classes, which should also have a low rate of mismatch (i.e., where two distinct font character glyphs are incorrectly matched to the same font model), font matching may be limited to where the contexts are the same. For example, the context for two models can be considered the same if they both have the same prefix or suffix loose-model. For example, for a given font, the number "1" and letter "l" may be almost identical. A standard JBIG2 matcher may normally attempt to match these two font models together. Allowing this font match can have adverse OCR consequences since mapping a unique OCR value to each font model is desired. By requiring a context-based match, the system can avoid false matches, even where the font characters are almost identical (e.g., "1" and "l"), but have different ASCII mappings. The number "1" is generally included in numeric strings, while the letter "l" is generally included in character strings. Thus, it is extremely unlikely that these two font characters will share a prefix or suffix font model context. In the absence of a shared context-based prefix or suffix loose-model, the match may be disallowed, keeping shape-similar distinct font characters from mismatching. This should allow for more accurate OCR text propagation.

A looser matcher may be used when two glyphs share the same "model context," which means that they each have immediate glyph neighbors which have the same models. In fact, the greater the degree of "model context," the looser the matcher than can be used. For instance, if the two glyphs each have the same immediate neighbor to the right and the same immediate neighbor to the left, a loose matcher may used. If, however, they have two of the same models on each side, giving a "model context" of length four, an even looser matcher may be used. If all of the other glyphs in the word containing these two glyphs match, such that the word would be identical if these two matched, an even further looser matcher may be used. By matching these two glyphs together, the system may then merge the model classes to which they each currently belong.

In an example embodiment of the present invention, in an instance where accuracy is the sole concern, the system and method may apply OCR processing to the entire input document, and subsequently use the models to correct those glyphs whose values differ from those of most or all of the other glyphs of the same respective model, for example by assigning to all of the glyphs belonging to the model the most common value. Alternatively, it may assign to all of the glyphs belonging to the model the value having the highest score, as further described below. In an example embodiment of the present invention, in an instance where speed is the main concern, the system and method may minimize the number of glyphs to which OCR processing is applied, e.g., by initially generating one or more model reference pages and forward propagation, as described above. In an example embodiment of the present invention, a balance may be struck where the system and method improves accuracy while running much faster than conventional OCR. The speedup is due to the fact that fewer calls are made to an OCR engine, with only selected zones or model reference pages being OCRed, as opposed to OCRing the entire document. The improved accuracy is due to the system's ability to recognize distinct glyphs as being in the same model class, thereby allowing it to use error correction and apply the same textual value to each of those glyphs.

In an example embodiment of the present invention, the system and method may initially determine whether to apply OCR processing to the original input document or to a min cover of all of the font character models depending on the ratio of glyphs to models. If there are significantly more glyphs than models, i.e., where there is a high compression rate, the system and method may apply OCR processing to a min word cover in order to increase the speed of processing. Where there is a low compression ratio, the system and method may instead apply OCR processing to the original input document.

In an example embodiment of the present invention, in an instance where the OCR processing returns different ASCII values to distinct instances of the same model, the system and method may assign to every instance of a representation of the model in the document the value which has the highest weighted score. Examples of such weightings will be given below.

The relative weight assigned to an ASCII value of a given model can be determined in part by the number of times in which the OCR engine returned that value to instances of that model. In an example embodiment of the present invention, the weight of an ASCII value may be determined, at least in part, by the length of the word in the model reference page, sub-document, or full document in which it appears.

Conventional OCR processing returns an ASCII value and a confidence level for the returned ASCII value. In an example embodiment of the present invention, the weight of an ASCII value may be determined, at least in part, by a confidence level returned by OCR processing.

In an example embodiment of the present invention, the weight of an ASCII value may be determined, at least in part, by whether the word in the model reference page appears in a dictionary.

For example, a model may be represented by multiple words in the input to OCR processing. For different words that include respective representations of the model, the OCR processing may return different ASCII values. The system and method may compare each of the words that includes at least one representation of a given font character model to words in an electronic dictionary. A dictionary match is where a word in the model reference page is found in a dictionary. In an instance where only one of the representative words has a dictionary match, the ASCII value assigned to the model representation in the found word may be assigned a greater weight than the other ASCII values. If a word has a dictionary match, and there are no other returned values for that model which would enable a similar dictionary match, there is an "exclusive dictionary match." For example, where the word "then" is on the model reference page, there would be a dictionary match. If the model for the letter 'e' also has one other returned value, which is an 'a,' since the word "than" is also a dictionary match, the model associated with this word would not have an exclusive dictionary match. However, if the other returned ASCII value for this model is a 'q,' in this case, the model would have an exclusive dictionary match. An even greater weight may be given to the mapping of a font character model's ASCII value if it is an exclusive dictionary match.

In an example embodiment of the present invention, for a given model, the system and method may determine, for each of the returned ASCII values, the number of words including representations of the model which would be found in the dictionary. The system and method may assign weights to the various ASCII values such that the greater the number of words finding matches in the dictionary as a result of application of the ASCII value, the greater the weight factor assigned. (The weight may be decreased, however, based on other factors.)

In an example embodiment of the present invention, if only one returned ASCII value for representations of a given font character model allows for a match to be found in the dictionary for all words in the original document that include representations of the model, then that value will be used, regardless of the other ASCII weighting factors.

In an example embodiment of the present invention, a different number or percentage of glyphs may be subject to OCR processing for different models. Whether few or many of the glyphs of a model are subject to OCR processing may depend on an extent to which the glyphs within the model vary. For example, the greater the variation or "distance" between the glyphs of the model, the more glyphs of the model may be subject to OCR processing. In an example embodiment of the present invention, for a given model, the system and method may select, for application thereto of OCR processing, those glyphs of the model whose distances are furthest apart. For example, whenever a model has two or more glyphs, OCR processing may be applied to at least the two glyphs of the model that have the furthest calculated distances compared to any other glyph that match the model. Alternatively, an approximate k-nearest neighbor tree may be used, where each node is given an indegree score based on how many nodes consider it among its k-nearest neighbors. Within each model class, the glyphs with the highest and lowest indegree score will be shown to the OCR engine, as these glyphs, to an approximation, represent the best and worst behaved glyphs associated with this font character model.

In an example embodiment of the present invention, the system and method may determine the distances between glyphs using second order moments of the glyphs.

In an example embodiment of the present invention, a higher than second order moment may be used for the distance calculations.

In an example embodiment of the present invention, the system and method may determine the distance metric of the glyphs using quadrant order moments of the glyphs. According to this embodiment, the bounding box of a glyph may be broken into four quadrants. For each quadrant, the second or higher order moments may be calculated. Subsequently, the system and method may use some or all of the resulting quadrant based second or higher order moment values of each of the glyphs to determine the distances.

In an example embodiment of the present invention, the system and method may determine the distance metric between glyphs using the XOR of the glyphs. Alternatively, the system and method may determine the distance metric between glyphs using a Weighted XOR of the glyphs.

In an example embodiment of the present invention, the system and method may determine for a given model, the number of instances of representations of the model (the composite bitmap or glyphs belonging to the model) to which to apply OCR processing depending on the geometric properties of the model. These geometric properties include the height, width, and median stroke thickness of the models.

Figure 5:
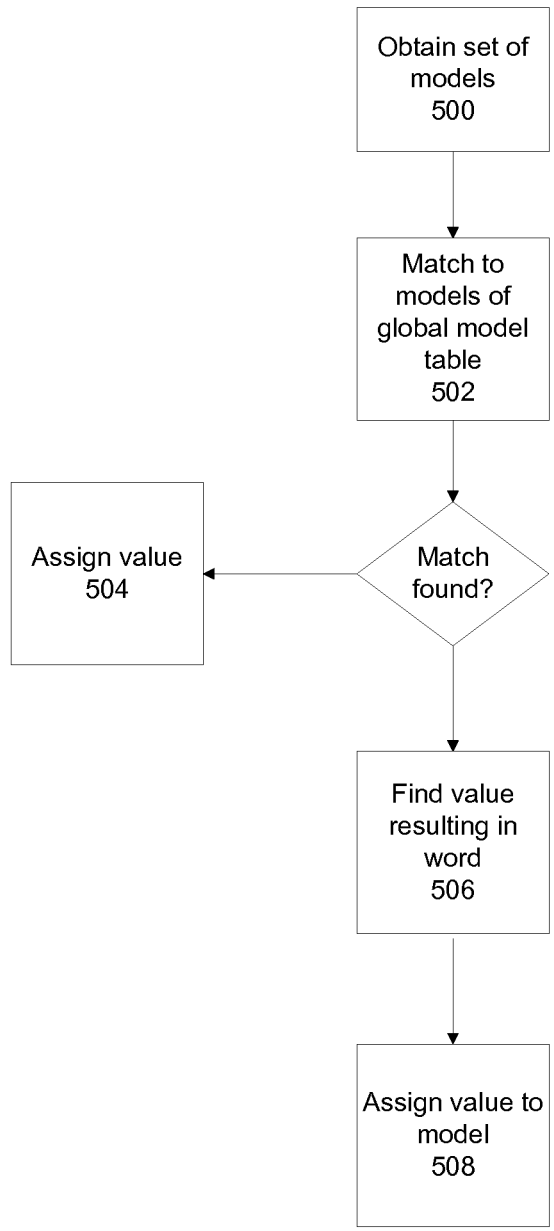
FIG. 5 is a flowchart that illustrates a method for determining a text value of an unmatched model using a word dictionary, according to an example embodiment of the present invention.

In an example embodiment of the present invention, a word dictionary may be used to determine a text value of an unmatched model of a page. Referring to FIG. 5, at step 500 the system matches glyphs on a page to obtain a set of models. At step 502, the system attempts to match the models to models previously added to the global table when processing pages and to which text values have been assigned. For each of the set of models obtained at step 500, if a match to a model of the global model table is found, the system, at step 504, assigns the text value of the model of the global model table to the model obtained at step 500, and ultimately to the glyphs of the model. Otherwise, at step 506, the system finds the text value which, if assigned to the glyphs of the model, results in one or more words of a stored dictionary, based on neighboring text of the glyphs of the model. For example, if a glyph of the model is part of a word whose other glyphs have been assigned text values, the system may find which text value, if assigned to the glyph of the model, would complete a word in the dictionary. At step 508, the system may assign to the model and ultimately to its glyphs the value determined at step 506. If more than one value may be assigned, the system may check other words in which glyphs of the model appear to find a single value that results in a word for all appearances of the glyphs of the model. If more than one value fits this criteria, in an example embodiment, the system may submit the glyphs to an OCR engine to obtain the text value(s).

In alternative example embodiments, another step or steps may substitute step 506. For example, in an example embodiment, if no match is found, the system may perform a step 506' (not shown) which essentially repeats step 502 except that it is performed for only those models not previously matched at step 502 and it is performed using a matching algorithm that is looser than that used at step 502. If the looser matching algorithm results in a match of the model to more than one other previously processed models, if the text values of all or a large majority of those other models are the same the text value of the other or large majority of other models may be assigned to the presently considered model. Alternatively, these steps may be used in conjunction with step 506, in that first the range of possible text values may be narrowed down to those of the models to which the present model matches using the loose matching algorithm. Subsequently, a single one of the text values may be selected from the range of possible values, which single value results in words in the dictionary.

Figure 6:
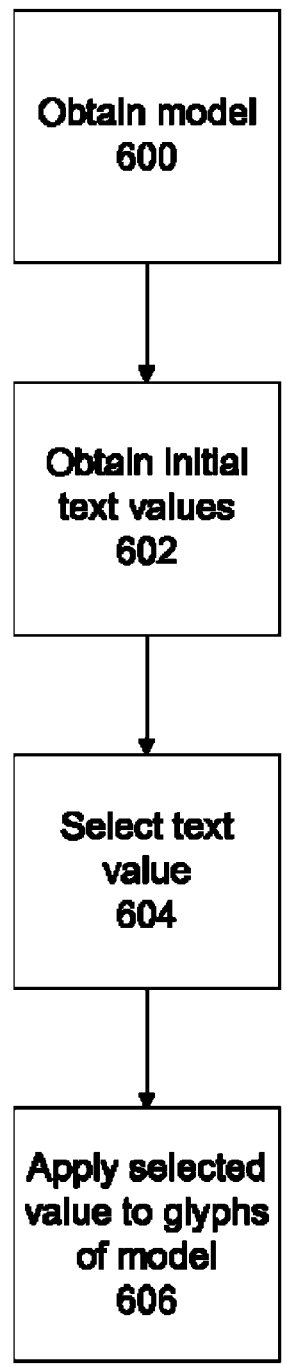
FIG. 6 is a flowchart that illustrates a method for assigning a text value to a model and then to a glyph, according to an example embodiment of the present invention.

FIG. 6 illustrates an example method of assigning a text value to a model and then to a glyph. At step 600, the system matches glyphs to obtain a model. At step 602, the system obtains initial text values for each (or a subset) of the glyphs, e.g., using an OCR method. It may occur that more different initial text values are obtained for different ones of the glyphs. At step 604, the system selects one of the initially obtained text values. For example, if a single value was obtained for a majority of the glyphs, that value may be selected. Alternatively, the values may be assigned a score based on a weighting scheme, e.g., as described above.

At step 606, the system applies the selected text value to all of the glyphs of the model. For example, if, for a glyph of the model, the selected text value differs from its initially obtained text value, the glyph may nevertheless be assigned the selected text value.

While models may be used to correct OCR processing results, as described above, it may occur that glyphs and/or sub-models are erroneously mapped to a single model. In such cases, forcing every instance of the model to a single ASCII value may result in less accurate results than those returned by OCR processing applied to the entire document. An erroneous mapping may be detected, for example, where there are contradictory exclusive dictionary matches for the same model. Since each value was provided by the OCR engine, and the dictionary lookup required that value, contradictory values would indicate an error. For example, for a first representation of the model, the OCR processing may return the ASCII value of "e" and for a second reference word containing the model, the OCR processing may return the ASCII value for "a." Furthermore, each of those ASCII values is the only one which would allow a certain word containing the model to find a dictionary match. In this instance, the system and method may determine that there is a high probability of error in the model mappings, since two different ASCII values are required to resolve all of the glyphs of the model. Example embodiments of the present invention may implement model correction processes to reverse such erroneous mappings.

For example, the system and method may initially group a first set of glyphs into a first model, a second set of glyphs into a second model, and subsequently determine that the first model and second model are similar enough to be grouped together into a third model, so that the first and second models become sub-models of the third model. This may occur, for example, where both a strict and a loose matching algorithm are used, such that the two sub-models are obtained using the strict algorithm and then the further match between the two sub-models may be obtained using the looser algorithm. Another example, is where the glyphs are initially matched to obtain the two sub-models, and then a composite bitmap of one of the sub-models is then matched to a glyph or composite bitmap of the second sub-model. Instead of mapping the third model directly back to the glyphs of the first and second models, the system and method may maintain a graph of the matching tree. The system and method may use the graph of the matching tree in order to reverse the previous merging together of certain model combinations where an error is detected.

In an example embodiment of the present invention, if a final font character model is determined to have a high probability of error, the system and method will do as follows. It will take the hierarchical matching tree representing the structure of model convergences that led to the final model, and traverse it from top to bottom. (Since the model matchers may be looser and less strict than the glyph matchers, the system begins the process of looking for a mismatch from the top of the tree.) It checks each level to see if it contains the erroneous convergence which led to the mismatch, by OCR processing the models and seeing if their text value differs. If a child model is found to have a different text value than its parent, the model and its matching sub-tree form a new model that is assigned that text value.

Figure 2:
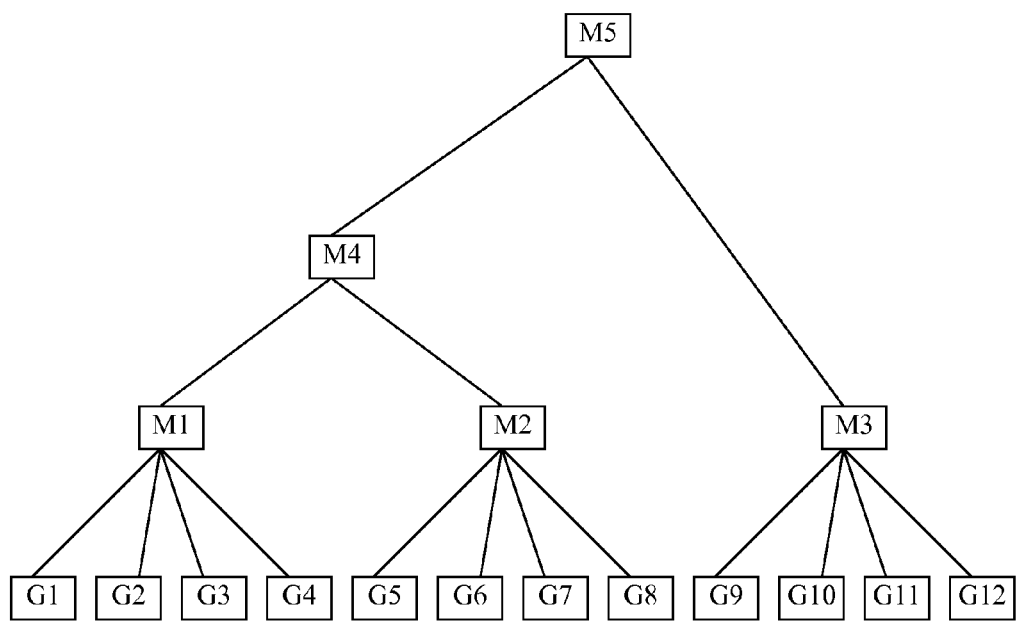
FIG. 2 illustrates a hierarchical tree of models and member glyphs which may be maintained and used according to an example embodiment of the present invention.

For example, FIG. 2 shows an example hierarchical model matching tree structure. The tree shows that glyphs G1-G4 were initially grouped into model M1, glyphs G5-G8 were initially grouped into model M2, and glyphs G9-G12 were initially grouped into model M3. The tree further shows that models M1 and M2 were then grouped into model M4. The tree further shows that models M4 and M3 were subsequently grouped into model M5. Referring to the tree shown in FIG. 2, it may occur that, as representations of model M5, the system and method inputs a composite bitmap for M5, and glyphs G6 and G12 into an OCR engine and the OCR process returns the ASCII value of 101 ("e") for M5 and G12 and the ASCII value of 97 ("a") for G6. It may further occur that one or more words including a representation of model M5 requires "e" in order for a match of the word to be found in the dictionary and one or more words including a representation of model M5 requires "a" in order for a match of the word to be found in the dictionary. In this instance, the system and method may require that font character models M3 and M4 also be given as input to the OCR engine. If the OCR processing results in the ASCII value of 101 for both M3 and M4, then the system and method may continue to the next lower level of the tree. The system and method may next apply OCR processing to M1 and M2. The OCR processing may return the ASCII value of 101 for the M1 representation and the ASCII value of 97 for the M2 representation.

Once the OCR processing returns divergent results, the system and method may responsively remove one of the sub-models from the model. For example, in the described example, since M2 has an ASCII value different than its parent M4, M2 may be removed from the M4 model (while M4 remains part of the M5 model). M2 may either remain its own separate model or may be joined with another model.

In an alternative example embodiment, the system and method may resolve an apparent model grouping error by applying OCR processing to each glyph of the input document that belongs to the model. For example, with reference to FIG. 2, the OCR processing may be applied to a new model reference page including each of glyphs G1 to G12. The system and method may then determine whether there exists significant groupings of OCR values that suggest multiple ASCII mappings. For example, the system and method may determine that one ASCII value is returned for a third of the glyphs and another ASCII value for two thirds of the glyphs, each of which may be considered significant groupings. The system and method may then separate the model into two models, one for each of the ASCII values which were returned in significant groups. ASCII values returned in insignificant numbers (e.g., relative to the number of glyphs) may be ignored. In an example embodiment of the present invention, the glyphs for which no ASCII value is returned by the OCR process may be joined to the font character model to which the glyphs are determined to be closest using a perceptually lossless metric.

In an example embodiment of the present invention, a system may include any suitably appropriate computing device or combination of computing devices, a non-exhaustive list of which includes a desktop computer or other workstation, a laptop, notebook computer, tablet PC, and handheld. The system may include any device configured to send, receive, analyze, compute, and/or display information. For example, the system may include a scanning device via which to obtain an image of a document, which the computing device may process in accordance with the methods described above to obtain machine-editable text document; a display device via which to display the machine-editable text document; and an input device via which to receive user-input for editing the text document.

In an example, the system may include a memory device configured to store software including instructions for performing the various method described above. The computing device may access the memory device and run the software. The memory device may also be configured to store data, such as operands and results used and produced by the processing device in running the software, including data representing the image document and the machine-editable text document.

Method examples described herein can be machine or computer-implemented. Some examples can include a computer-readable medium or machine-readable medium encoded with instructions operable to configure a processing device to perform methods as described herein. An implementation of such instructions can include code, such as microcode, assembly language code, a higher-level language code, or the like, which is computer readable for performing the various described methods. The code may form portions of computer program products. The memory device may include one or more volatile or non-volatile computer-readable media. These computer-readable media may include, but are not limited to, hard disks, removable magnetic disks, removable optical disks (e.g., compact disks and digital video disks), magnetic cassettes, memory cards or sticks, RAM, ROM, and the like.

Those skilled in the art can appreciate from the foregoing description that the present invention may be implemented in a variety of forms, and that the various embodiments may be implemented alone or in combination. Therefore, while the embodiments of the present invention have been described in connection with particular examples thereof, the true scope of the embodiments and/or methods of the present invention should not be so limited since other modifications will become apparent to the skilled practitioner upon a study of the drawings and specification.

What is claimed is:

1. A method of converting an image document into machine-editable text, comprising:
   matching, by a computer processor, glyphs of a document;
   grouping, by the processor, the matched glyphs into a first model;
   assigning, by the processor, a text value to the first model; and
   applying, by the processor, the value to all of the glyphs in the first model;
   wherein:
      the document includes a first group of at least three consecutive glyphs and a second group of at least three consecutive glyphs; and
      the matching of the glyphs of the document includes:
         matching at least two of the consecutive glyphs of the first group to at least two of the consecutive glyphs of the second group using a first matching algorithm, at least one of the glyphs of the first group remaining unmatched via the first matching algorithm; and
         conditional upon that the at least two consecutive glyphs of the first group occupy positions relative to the first group that correspond to positions occupied by the at least two glyphs of the second group relative to the second group, using a second matching algorithm that is looser than the first matching algorithm to determine, for each of the at least one glyph of the first group, whether the unmatched glyph of the first group matches the glyph of the second group that occupies the position relative to the second group corresponding to the position occupied by the unmatched glyph relative to the first group.

2. The method of claim 1, wherein the matching of the glyphs is performed using a feature matcher.

3. The method of claim 1, wherein the greater the number of consecutive glyphs of the group that are matched to glyphs of corresponding positions in the second group, the looser the matcher used for determining whether the at least one glyph of the first group matches glyphs of corresponding positions of the second group.

4. The method of claim 1, wherein:
   the document includes a plurality of pages; and
   the first model includes glyphs from at least two of the pages.

5. The method of claim 1, wherein the first model includes glyphs from multiple documents, each of the documents being stored as a separate file.

6. The method of claim 1, wherein the matching of the glyphs is performed using a Quadrant Hausdorff matcher.

7. The method of claim 1, wherein the matching of the glyphs is performed using a tangent matcher.

8. The method of claim 1, wherein the matched glyphs grouped into the first model are of a first page of the document, the method further comprising:
   saving the first model;
   matching glyphs of a second page to a representative of the first model; and
   applying the text value of the first model to the matched glyphs of the second page.

9. The method of claim 1, wherein the first model is one of a plurality of models generated for glyphs of a first page of the document, the method further comprising:
 matching glyphs of a second page of the document to models of the first page;
 applying to the matched glyphs of the second page respective text values of the respective models to which the matched glyphs of the second page were matched;
 if a particular glyph of the second page is not matched to the models of the first page, finding a single text value applicable to the particular glyph, wherein the finding of the single text value includes using a word dictionary.

10. The method of claim 1, further comprising:
 matching the first model to a second model generated based on glyph matching, wherein a text value assigned to the second model is assigned to the first model in response to the matching of the first model to the second model.

11. The method of claim 1, wherein the matching, grouping, and assigning steps are performed as part of steps by which:
 for each of a plurality of matching algorithms differing in their levels of strictness, a first glyph of the document is matched to other glyphs of the document to obtain respective models; and
 based on the matching using the plurality of matching algorithms, a text value of one of the obtained models is assigned to the first glyph.

12. The method of claim 1, wherein, for the each of the at least one glyph, the value is applied to the respective glyph without consideration of any text value assigned to the respective glyph prior to the application of the value to the respective glyph.

13. The method of claim 1, wherein the assignment of the text value to the first model is performed by selecting one of the glyphs of the first model, and, based on the selection, assigning to the first model a text value assigned to the selected glyph.

14. A method of converting an image document into machine-editable text, comprising:
 matching, by a computer processor, glyphs of a document;
 grouping, by the processor, the matched glyphs into a first model, wherein the first model is one of a plurality of models generated for glyphs of a first page of the document;
 assigning, by the processor, a text value to the first model;
 applying, by the processor, the value to all of the glyphs in the first model;
 using a first matching algorithm, matching, by the processor, glyphs of a second page of the document to models of the first page;
 applying, by the processor and to the glyphs of the second page matched via the first matching algorithm, respective text values of the respective models to which the glyphs were matched; and
 executing, by the processor, an algorithm according to which:
  if a particular glyph of the second page is not matched to the models of the first page using the first matching algorithm, the processor uses a second matching algorithm looser than the first matching algorithm to match the particular glyph to one or more models of the first page;
  if (a) the particular glyph is matched via the use of the second matching algorithm to more than one model of the first page and (b) all of the matching models have the same text value, the processor applies the text value of the all of the matching models to the particular glyph; and
  if (a) the particular glyph is matched via the use of the second matching algorithm to more than one model of the first page and (b) different ones of the matching models have different text values, the processor selects one of the different text values.

15. The method of claim 14, wherein the selection of the one of the different text values includes:
 using a word dictionary to narrow down a set of possible ones of the different text values to be applied;
 if the set is narrowed down to one, applying the one value to the particular glyph; and
 if the set is narrowed down to a subset including more than one value, selecting a text value for the particular glyph without assigning the particular glyph to any of the models of the first page.

16. A method of propagating textual values across image pages, comprising:
 generating, by a computer processor, a model, the generating of the model including:
  matching glyphs on a first page;
  grouping the matched glyphs into the model; and
  assigning a text value to the model;
 subsequent to the generating of the model, matching, by the processor, glyphs on a second page to the model; and
 based on the assignment of the text value to the model, assigning, by the processor and to the matched glyphs of the second page, the text value assigned to the model, wherein, for at least one glyph, the text value is applied to the respective glyph based on the respective glyph being associated with the model;
 wherein:
  the document includes a first group of at least three consecutive glyphs and a second group of at least three consecutive glyphs; and
  the matching of the glyphs of the first page includes:
   matching at least two of the consecutive glyphs of the first group to at least two of the consecutive glyphs of the second group using a first matching algorithm, at least one of the glyphs of the first group remaining unmatched via the first matching algorithm; and
   conditional upon that the at least two consecutive glyphs of the first group occupy positions relative to the first group that correspond to positions occupied by the at least two glyphs of the second group relative to the second group, using a second matching algorithm that is looser than the first matching algorithm to determine, for each of the at least one glyph of the first group, whether the unmatched glyph of the first group matches the glyph of the second group that occupies the position relative to the second group corresponding to the position occupied by the unmatched glyph relative to the first group.

17. The method of claim 16, wherein the model is unaffected by the matched glyphs of the second page.

18. The method of claim 16, further comprising:
 updating the model in response to the matching of the glyphs of the second page.

19. A method of assigning textual values to glyphs, comprising:
 matching, by a computer processor, glyphs of a document;
 grouping the matched glyphs, by the processor, into a model;

for each of at least a first subset of the glyphs of the model, determining, by the processor, a respective text value of the glyph, wherein different text values are determined for at least two different ones of the at least the first subset of glyphs;

based on the text values determined for the first subset of the glyphs, assigning, by the processor, a text value to the model; and assigning, by the processor and to each of a second subset of the glyphs of the model, the text value assigned to the model;

wherein the step of assigning the text value to the model includes:

for each of the different text values, recording a number of glyphs of the first subset of glyphs to which the respective text value is assigned; and selecting the text value for which a greatest of the numbers is recorded as the text value assigned to the model.

20. The method of claim 19, further comprising:

assigning to each of the first subset of the glyphs of the model the text value assigned to the model, wherein the text value assigned to the model is different than the text value determined for at least one of the first subset of glyphs.

21. The method of claim 19, wherein the first subset contains all the glyphs of the model.

22. The method of claim 19, wherein the second subset contains all the glyphs of the model.

23. The method of claim 19, wherein the first subset includes at least those glyphs of the model which are most distant from each other compared to all other possible pairwise combinations of the glyphs of the model.

24. The method of claim 23, wherein the distance is measured by XOR.

25. A method of assigning textual values to glyphs, comprising:

matching, by a computer processor, glyphs of a document;

grouping the matched glyphs, by the processor, into a model;

for each of at least a first subset of the glyphs of the model, determining, by the processor, a respective text value of the glyph, wherein different text values are determined for at least two different ones of the at least the first subset of glyphs;

based on the text values determined for the first subset of the glyphs, assigning, by the processor, a text value to the model; and assigning, by the processor and to each of a second subset of the glyphs of the model, the text value assigned to the model;

wherein the step of assigning the text value to the model includes, for each of the different text values:

determining a number of those glyphs for which the respective text value had been determined that, if assigned the respective text value, results in a word in a dictionary;

assigning to the text value a weight depending on the respective number determined for the text value; and selecting the text value for assignment to the model based on the different weights.

26. A method of assigning textual values to glyphs, comprising:

matching, by a computer processor, glyphs of a document;

grouping the matched glyphs, by the processor, into a model;

for each of at least a first subset of the glyphs of the model, determining, by the processor, a respective text value of the glyph, wherein different text values are determined for at least two different ones of the at least the first subset of glyphs;

based on the text values determined for the first subset of the glyphs, assigning, by the processor, a text value to the model; and assigning, by the processor and to each of a second subset of the glyphs of the model, the text value assigned to the model;

wherein the step of assigning the text value to the model includes, for each of the different text values:

determining a number of those glyphs of the first subset that, if assigned the respective text value, results in a word in a dictionary;

assigning to the text value a weight depending on the respective number determined for the text value; and selecting the text value for assignment to the model based on the different weights.

27. A method of converting an image document into machine-editable text, comprising:

for each of a set of first glyphs:

determining, by a computer processor, whether the respective first glyph matches a second glyph; and executing, by a processor an algorithm according to which:

if a determination of the determining step is that the respective first glyph matches the second glyph, the processor assigns a same text value to the respective first glyph and the second glyph, wherein:

the determination of the match is conditional upon that the respective first glyph and the second glyph occupy a same vertical position relative to each of the respective first glyph's and second glyph's respective surrounding environment; and different vertical positions relative to respective surrounding environments are occupiable by glyphs of a same size; and if a determination of the determining step is that the respective first glyph does not match the second glyph, the processor separately determines text values for the respective first glyph and the second glyph.

28. The method of claim 27, wherein the determination of the match is conditional upon that the respective first glyph and the second glyph occupy a same vertical position relative to respective words in which the respective first glyph and the second glyph are included.

29. The method of claim 27, wherein the determination of the match is conditional upon that the respective first glyph and the second glyph occupy a same vertical position relative to respective lines in which the respective first glyph and the second glyph are included.

30. The method of claim 27, further comprising:

prior to the determining for the respective first glyph, extending a height of a bitmap of the respective first glyph and a height of a bitmap of the second glyph;

wherein, for the determining for the respective first glyph, the extended bitmaps are compared.

31. A method of converting an image document into machine-editable text, comprising:

for each of a plurality of matching algorithms differing in their levels of strictness, matching, by a computer processor, a first glyph of the document to other glyphs of the document to obtain respective models; and assigning, by the processor and to the first glyph, a text value of one of the obtained models, wherein the assigning includes:
   for each model:
      obtaining a text value for each of the glyphs of the respective model; and
      determining whether a same text value was obtained for at least a predetermined threshold percentage of glyphs of the respective model;
   of the models for at least the threshold percentage of glyphs of which the same respective text value was obtained, selecting the model generated using one of the strictest one of the matching algorithms and the loosest one of the matching algorithms; and
   applying to the first glyph the text value of the at least the threshold percentage of glyphs of the selected model.

32. The method of claim 31, wherein the assigning step includes, of the models for at least the threshold percentage of glyphs of which the same respective text value was obtained, selecting the model generated using the loosest one of the matching algorithms.

33. The method of claim 31, wherein the assigning step includes, of the models for at least the threshold percentage of glyphs of which the same respective text value was obtained, selecting the model generated using the strictest one of the matching algorithms.

34. A method of converting an image document into machine-editable text, comprising:
   matching, by a computer processor, glyphs of a document;
   grouping, by the processor, the matched glyphs into a first model;
   assigning, by the processor, a text value to the first model;
   applying, by the processor, the value to all of the glyphs in the first model; and
   determining, by the processor, whether the first model matches any other model generated based on glyph matching and to which a text value has been assigned;
   wherein:
      if a determination of the determining step is that the first model matches a second model generated based on glyph matching and to which a text value has been assigned, the text value of the second model is assigned to the first model; and
      if the determination of the determining step is that the first model does not match any model generated based on glyph matching and to which a text value has been assigned, one of:
         a plurality of possible text values for the first model is determined based on text values of its neighboring glyphs whose models have been matched;
         the first model is otherwise mapped to the text value assigned in the assigning step to the first model; and
         the method further comprises, via use of a first matching algorithm, which is looser than a second matching algorithm used for the determining of whether the first model matches any other model generated based on glyph matching and to which a text value has been assigned, matching the first model to one or more other models generated based on glyph matching and to which a text value has been assigned, the assignment of the text value to the first model being based on the text values of the one or more other models.

35. The method of claim 34, wherein if the determination of the determining step is that the first model does not match any model generated based on glyph matching and to which a text value has been assigned, the first model is otherwise mapped to the text value assigned in the assigning step to the first model.

36. The method of claim 34, wherein if the determination of the determining step is that the first model does not match any model generated based on glyph matching and to which a text value has been assigned, the plurality of possible text values for the first model is determined based on the text values of its neighboring glyphs whose models have been matched.

37. The method of claim 36, wherein, if the determination of the determining step is that the first model does not match any model generated based on glyph matching and to which a text value has been assigned, the plurality of possible text values is narrowed based on a word dictionary.

38. The method of claim 37, wherein the narrowing of the possible text values is to those text values which, if assigned to the model, result in a word in the dictionary.

39. The method of claim 36, wherein, if the determination of the determining step is that the first model does not match any model generated based on glyph matching and to which a text value has been assigned, the plurality of possible text values is narrowed using frequencies associated with different possible text values given one or more contexts in which glyphs of the first model appear.

40. The method of claim 39, wherein the context includes positions on both sides of the glyphs of the first model.

41. The method of claim 34, further comprising: using a first matching algorithm, determining whether the first model matches any other model generated based on glyph matching and to which a text value has been assigned; wherein if the determination of the determining step is that the first model does not match any model generated based on glyph matching and to which a text value has been assigned, the method further comprises, via use of the first matching algorithm, matching the first model to one or more other models generated based on glyph matching and to which a text value has been assigned, the assignment of the text value to the first model being based on the text values of the one or more other models.

* * * * *